(12) United States Patent
Twitchett

(10) Patent No.: US 9,377,128 B2
(45) Date of Patent: Jun. 28, 2016

(54) FLOW-VOLUME REGULATOR

(75) Inventor: Simon Twitchett, Worcester (GB)

(73) Assignee: NEOPERL GMBH, Mullheim (DE)

( * ) Notice: Subject to any disclaimer, the term of this patent is extended or adjusted under 35 U.S.C. 154(b) by 183 days.

(21) Appl. No.: 14/117,492

(22) PCT Filed: Mar. 23, 2012

(86) PCT No.: PCT/EP2012/001286
§ 371 (c)(1),
(2), (4) Date: Nov. 13, 2013

(87) PCT Pub. No.: WO2012/156002
PCT Pub. Date: Nov. 22, 2012

(65) Prior Publication Data
US 2014/0332097 A1     Nov. 13, 2014

(30) Foreign Application Priority Data

May 17, 2011   (DE) .................... 20 2011 100 800 U

(51) Int. Cl.
*F16K 47/08*     (2006.01)
*G05D 7/01*      (2006.01)
*F16K 15/14*     (2006.01)

(52) U.S. Cl.
CPC ................. *F16K 47/08* (2013.01); *F16K 15/14* (2013.01); *G05D 7/012* (2013.01); *Y10T 137/7792* (2015.04)

(58) Field of Classification Search
CPC .......... F16K 15/08; F16K 15/14; F16K 47/08
USPC .............. 137/512.1, 517, 512.15; 138/43, 46
See application file for complete search history.

(56) References Cited

U.S. PATENT DOCUMENTS

| | | | | |
|---|---|---|---|---|
| 2,506,152 A * | 5/1950 | Hunter | ......................... | 251/120 |
| 2,777,464 A * | 1/1957 | Mosely | .................... | 137/516.13 |
| 3,216,451 A * | 11/1965 | Smallpeice | ............ | G05D 7/012 |
| | | | | 137/516.25 |
| 3,847,178 A * | 11/1974 | Keppel | ....................... | 137/515.7 |
| 5,027,861 A * | 7/1991 | Gute | .................... | F16L 55/027 |
| | | | | 138/43 |
| 6,571,831 B1 * | 6/2003 | Hart | ............................... | 138/46 |
| 6,695,011 B2 * | 2/2004 | Sochtig | ........................... | 138/43 |
| 7,594,519 B2 * | 9/2009 | Hart et al. | ...................... | 138/43 |

(Continued)

FOREIGN PATENT DOCUMENTS

| | | |
|---|---|---|
| DE | 2131117 | 1/1973 |
| FR | 1175236 | 3/1959 |

(Continued)

*Primary Examiner* — Craig Schneider
*Assistant Examiner* — Daniel P Donegan
(74) *Attorney, Agent, or Firm* — Volpe and Koenig, P.C.

(57) ABSTRACT

A flow-volume regulator includes a regulator housing having at least one regulator ring channel having an elastic annular flow restrictor which bounds, between itself and a channel wall that bearings a regulator profiling, a control gap in which a passage cross section is altered by the flow restrictor, which deforms under the pressure difference that forms during flow, and also includes at least one valve which has a valve body which moves under pressure of flowing medium from an open position into a closed position, in which the valve body closes off at least one valve opening. The flow-volume regulator also includes a valve ring channel in the regulator housing having least one valve opening in the region of its channel base, the valve body is annular and elastic, which deforms under pressure of the flowing medium such that the valve body moves from an open into a closed position.

12 Claims, 4 Drawing Sheets

(56) References Cited

U.S. PATENT DOCUMENTS

| | | | |
|---|---|---|---|
| 7,753,070 B2* | 7/2010 | Hart | 137/512.15 |
| 8,348,227 B2* | 1/2013 | Zoller | 251/120 |
| 2006/0169330 A1* | 8/2006 | Hart | 137/512.15 |

FOREIGN PATENT DOCUMENTS

| | | |
|---|---|---|
| FR | 2507795 | 12/1982 |
| WO | 2004003673 | 1/2004 |

* cited by examiner

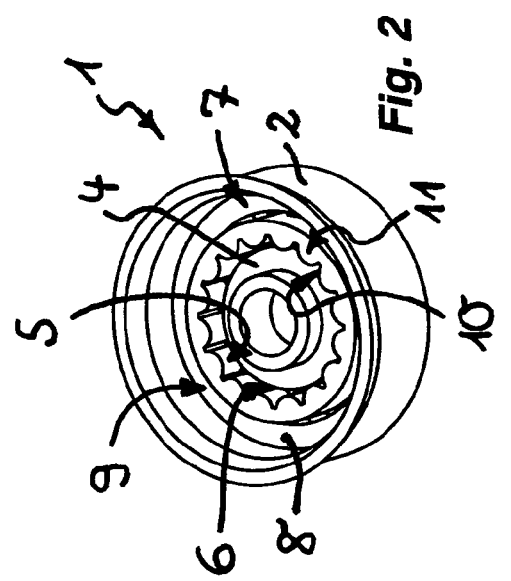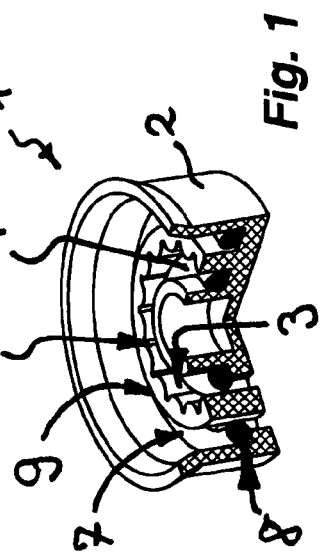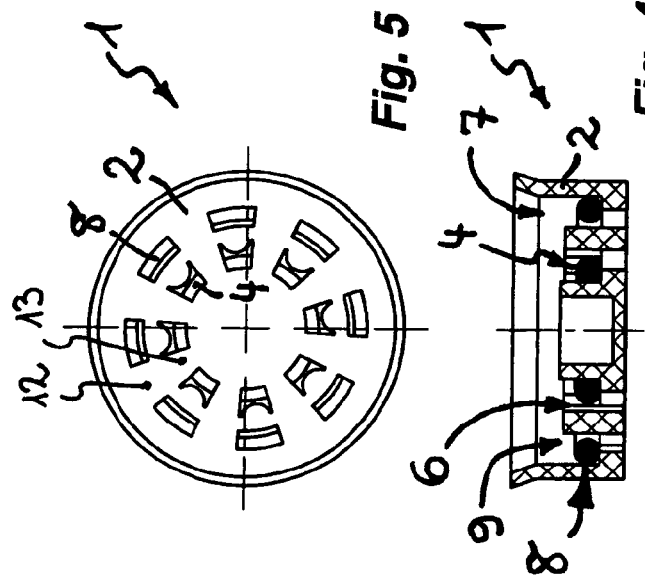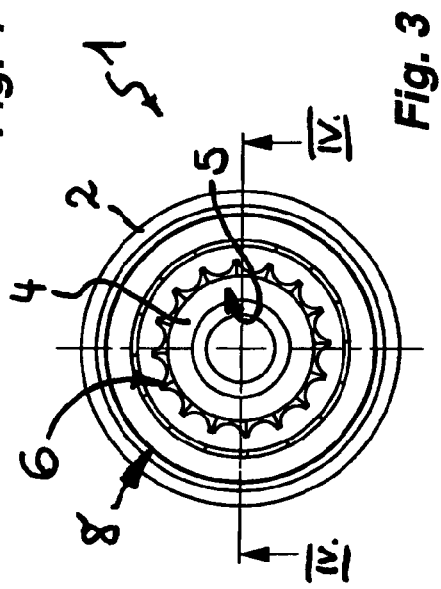

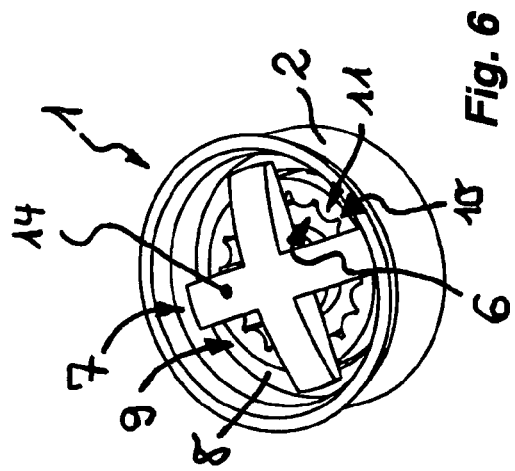
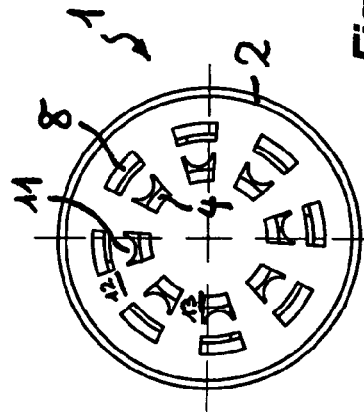
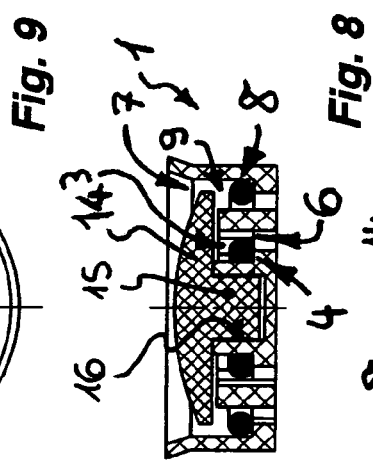
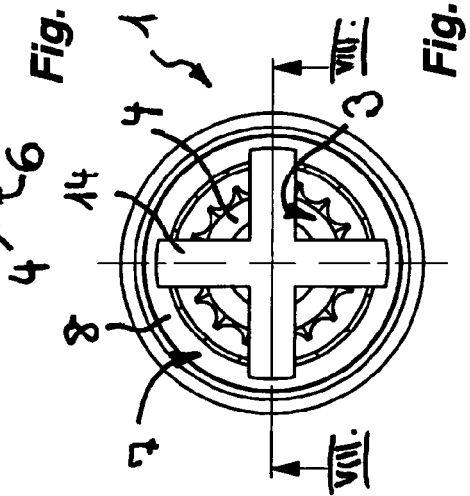

FLOW-VOLUME REGULATOR

BACKGROUND

The invention relates to a flow rate regulator having a housing that has at least one regulator annular channel in which there is provided an annular throttle body comprised of elastic material, which throttle body delimits a control gap between itself and a channel wall which bears a regulating profiling, the passage cross section of which control gap can be varied by the throttle body that deforms under the pressure difference that is generated as flow passes through, and having at least one valve that has a valve body which, under the pressure of the medium flowing through, moves from an open position into a closed position counter to a restoring force, in which closed position the valve body closes off at least one valve opening.

FR 1 175 236 A has already disclosed a flow rate regulator which, by way of its disk-shaped regulator housing, can be interconnected between two adjacent line sections of a pipeline. For this purpose, the already-known flow regulator has multiple flow openings, of which at least one flow opening has a constant clear cross section, whereas, in at least one other flow opening, there is provided a regulating body which borders the flow cross section and which is comprised of elastic material and which constricts to an increasing extent under the pressure of the fluid flowing through. Whereas the flow rate through the flow openings that have a constant cross section increases with rising pressure, the flow rate through the flow openings that have the elastic regulating bodies falls with rising pressure of the fluid flowing through, the overall result being a flow rate which initially rises steeply with rising pressure and which, with further rising pressure, subsequently reaches a virtually constant maximum value. This already-known flow rate regulator however does not have any valves which, under the pressure of the fluid flowing through, could move from an open position into any closed position counter to a restoring force.

WO 2004/003673 A1 has already disclosed a flow rate regulator which, in its regulator housing, has two regulator units arranged concentrically with respect to one another, of which each regulator unit has, in an encircling passage channel, a control pin or regulating core which is engaged around in each case by an annular throttle body comprised of elastic material, which throttle body delimits between itself and the control pin and/or the housing inner circumference a control gap whose passage cross section can be varied by the throttle body that deforms under the pressure difference that is generated as flow passes through. Here, an inner regulator unit is arranged in the control pin or regulating core of the second outer regulator unit. While even high throughputs in liters per unit of time can be regulated by means of the outer, relatively large regulator unit, fine-tuning of the amount of water flowing through it is possible with the relatively small inner regulator unit. None of the substantially structurally identical regulator units provided in the already-known flow rate regulator as per WO 2004/003673 A1 constitutes a valve which, under the pressure of the water flowing through, could be moved between an open position and a closed position.

A flow rate regulator of the type mentioned in the introduction is already known from FIG. 6 of DE-A 21 31 117. The already-known flow rate regulator has a regulator housing that has a regulator annular channel in which there is provided an annular throttle body comprised of elastic material, which throttle body delimits a control gap between itself and the inner channel wall which bears a regulating profiling, the passage cross section of which control gap can be varied by the throttle body that deforms under the pressure difference that is generated as flow passes through. With increasing pressure, the throttle body, which is comprised of elastic material, deforms into the regulating profiling such that the passage cross section of the control gap becomes increasingly constricted, such that the maximum flow rate is limited to a fixed value in a manner independent of pressure. In the center, bordered by the regulator annular channel, of the regulator housing there is provided an inflow valve that has a valve body which, under the pressure of the medium flowing through, moves in an axial direction from an open position into a closed position counter to a restoring force, in which closed position the valve body closes off at least one valve opening. The additional inflow valve has the task of creating an additional liquid passage in the case of low connection pressure, which liquid passage, in the case of rising pressure, ensures a rapid increase in flow rate up to the desired maximum value.

Since the axial actuation movement of the valve body provided in the inflow valve requires a certain installation height, the already-known flow rate regulator is relatively tall. In order that the valve opening of the inflow valve provided in the center of the regulator housing has an adequately large flow cross section, the regulator housing has a correspondingly large housing cross section. The flow rate regulator already known from DE-A 21 31 117 is therefore relatively voluminous and cannot be used under restricted space conditions, for example in the water outlet of a slim sanitary outlet fitting. Furthermore, the already-known flow rate regulator is relatively complex and cumbersome to manufacture.

SUMMARY

It is therefore the object in particular to provide a flow rate regulator of the type mentioned in the introduction which is inexpensive to manufacture, exhibits high performance and can nevertheless be of compact configuration.

According to the invention, this object is achieved in the case of the flow rate regulator of the type mentioned in the introduction in particular in that the valve body is provided in a valve annular channel of the regulator housing, which valve annular channel has at least one valve opening on its channel base, in that the valve body is of annular configuration and is produced from elastic material, and in that the annular valve body deforms under the pressure of the medium flowing through such that the valve body moves from the open position into the closed position counter to the restoring force of the inherent elasticity of the elastic material used for the valve body.

The flow rate regulator according to the invention has at least one inflow valve, the valve body of which is provided in a valve annular channel of the regulator housing, which valve annular channel has at least one valve opening on its channel base. Due to the annular shaping adapted to the regulator annular channel, the at least one valve opening of the valve may have a relatively large opening cross section. The valve body is of annular configuration and can be manufactured inexpensively from elastic material. Since the valve body does not need to be guided in a displaceable manner for example in an axial direction, but rather deforms under the pressure of the inflowing medium such that the valve body moves from the open position into the closed position counter to the restoring force of the inherent elasticity of the elastic material used for said valve body, the valve used according to the invention is also not susceptible to faults and requires little maintenance. Since the valve body does not need to be guided in a displaceable manner for example in an axial direction, and since, as a result of the annular shaping adapted to the regulator annular channel, the valve opening can be configured in a space-saving manner and nevertheless with a relatively large clear opening area, it is possible for the flow rate regulator according to the invention to be of high-performance and compact configuration.

The high-performance and space-saving configuration of the flow rate regulator according to the invention is further enhanced if the at least one valve annular channel and the at least one regulator annular channel are arranged concentrically with respect to one another.

To be able to attain the desired maximum value of the flow rate as quickly as possible in the case of rising pressure of the inflowing medium, it is advantageous for at least one valve annular channel to be arranged to the outside of a regulator annular channel.

A preferred embodiment of the invention which is characterized by consistently good regulator characteristics provides that the regulating profiling is formed by recessed portions and protruding portions, oriented preferably in the throughflow direction, of the channel wall.

Here, it may be expedient for the regulating profiling to be provided on an inner and/or preferably an outer channel wall of the at least one regulator annular channel. One preferred embodiment of the invention provides that the regulating profiling is arranged on an outer channel wall of the at least one regulator annular channel.

To prevent the valve and throttle bodies, which are produced from relatively lightweight elastic material, from floating upward and to ensure the arrangement of the throttle body and of the valve body in the associated annular channel, one preferred refinement of the invention provides that the throttle body in the regulator annular channel and/or the valve body in the valve annular channel are/is secured at both sides in the axial direction.

Here, the throttle body and valve body are reliably prevented from floating upward if the inflow side, which serves as an insertion opening for the throttle and valve bodies, of the regulator annular channel and/or valve annular channel can be secured by means of at least one preferably cross-shaped securing element.

To be able to place the throttle body and the valve body in the associated annular channel and subsequently secure them therein, it is expedient for the at least one securing element to be held in a releasable and preferably releasably lockable manner on the regulator housing.

BRIEF DESCRIPTION OF THE DRAWINGS

Refinements of the invention will emerge from the claims in conjunction with the description and figures. The invention will be explained in yet more detail below on the basis of preferred exemplary embodiments.

In the figures:

FIG. 1 shows, in a perspective partial longitudinal section, a flow rate regulator which has a regulator housing with two concentric annular channels, of which, in a regulator annular channel, there is provided a throttle body which is produced from elastic material and which is of annular form, whereas a valve annular channel, which is arranged to the outside of said regulator annular channel and which is assigned an inflow valve, receives within it a valve body which is produced from elastic material and which is likewise of annular configuration, FIG. 2 shows the flow rate regulator from FIG. 1 in a perspective and obliquely inclined plan view of the inflow side, FIG. 3 shows the flow rate regulator from FIGS. 1 and 2 in a plan view of the inflow side of its regulator housing, FIG. 4 shows the flow rate regulator from FIGS. 1 to 3 in a longitudinal section in section plane IV-IV from FIG. 3, FIG. 5 shows the flow rate regulator from FIGS. 1 to 4 in a plan view of its outflow side, FIG. 6 shows the flow rate regulator from FIGS. 1 to 5 in a perspective and obliquely inclined plan view of the inflow side, wherein the throttle body arranged in the regulator annular channel and the valve body provided in the valve annular channel are secured in the regulator housing, so as to be prevented from floating upward, by means of a securing element which is in this case of cross-shaped form, which securing element is held in a releasably connectable and preferably releasably lockable manner on the inflow side of the regulator housing, FIG. 7 shows the embodiment of the flow rate regulator shown in FIG. 6, in a plan view of its inflow side, FIG. 8 shows the flow rate regulator embodiment as per FIGS. 6 and 7 in a longitudinal section in section plane VIII-VIII from FIG. 7, FIG. 9 shows the flow rate regulator embodiment as per FIGS. 6 to 8 in a plan view of the outflow side of the regulator housing.

DETAILED DESCRIPTION OF THE PREFERRED EMBODIMENTS

Figure 11:
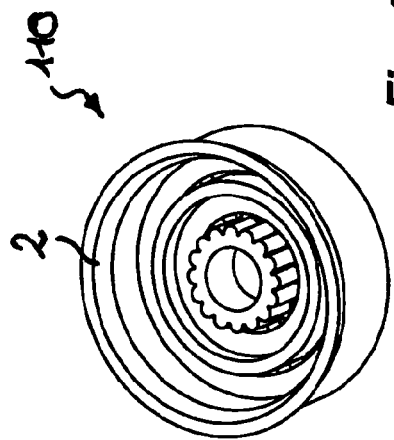
FIG. 11 shows the flow rate regulator from FIG. 10 in a perspective and slightly inclined plan view of the inflow side.
Figure 10:
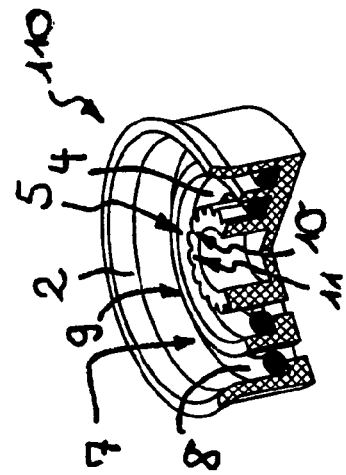
FIG. 10 shows a flow rate regulator of similar configuration to FIGS. 1 to 9 in a perspective partial longitudinal section, wherein the throttle body arranged in a regulator annular channel delimits a control gap between itself and an, in this case, inner profiled channel wall.
Figure 14:
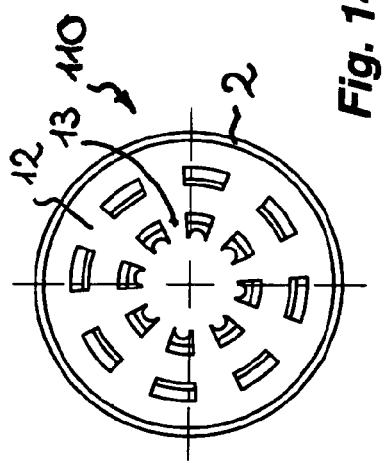
FIG. 14 shows the flow rate regulator from FIGS. 10 to 13 in a plan view of the outflow side of the regulator housing.
Figure 13:
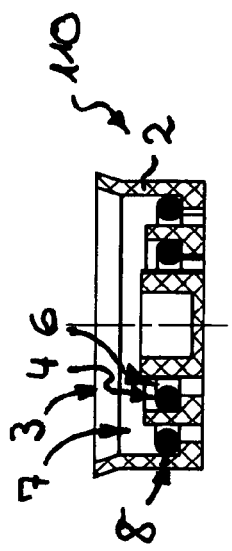
FIG. 13 shows the flow rate regulator from FIGS. 10 to 12 in a longitudinal section through section plane XIII-XIII from FIG. 12.
Figure 12:
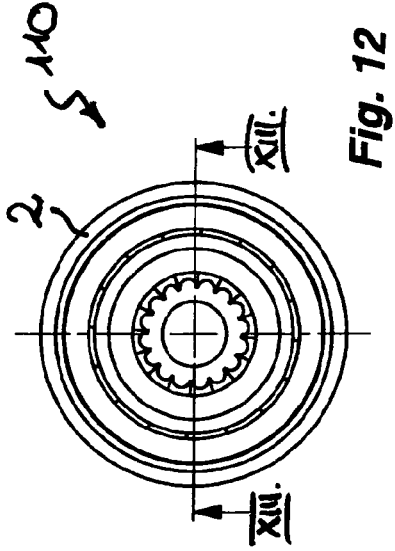
FIG. 12 shows the flow rate regulator from FIGS. 10 and 11 in a plan view of the inflow side.

FIGS. 1 to 9 and 10 to 14 show different embodiments 1, 110 of a flow rate regulator. The flow rate regulators 1, 110 have a regulator housing 2 which can be inserted into a sanitary water line, for example into the water outlet of a sanitary outlet fitting. The regulator housing 2 of the flow rate regulator 1, 110 has a regulator annular channel 3 in which there is provided an annular throttle body 4 comprised of elastic material. The elastic throttle body 4 delimits a control gap 6 between itself and a channel wall which bears a regulating profiling 5, the passage cross section of which control gap 6 can be varied by the throttle body 4 that deforms under the pressure difference that is generated as flow passes through. With increasing pressure, the throttle body 4 comprised of elastic material deforms into the regulating profiling 5, such that the passage cross section of the control gap 6 is increasingly constricted, such that the maximum flow rate is limited to a fixed value in a manner independent of pressure.

Whereas, in the case of the flow rate regulator 1 as per FIGS. 1 to 9, the channel wall that bears the regulating profiling 5 and delimits the control gap 6 is the outer channel wall of the regulator annular channel 3, it is the case in the flow rate regulator 110 shown in FIGS. 10 to 14 that the regulating profiling 5 is provided on the inner channel wall. Since the control gap 6, provided between the throttle body 4 and profiled channel wall, of the flow rate regulator 1 has a relatively large clear opening cross section, said flow rate regulator 1 is preferably provided for applications that require a relatively large maximum flow rate.

The flow rate regulators 1, 110 have a valve 7 which has a valve body 8 which, under the pressure of the medium flowing through, moves from an open position into a closed position counter to a restoring force, in which closed position the valve body 8 closes off at least one valve opening.

Here, the valve body 8, which is of annular configuration and manufactured from elastic material, is provided in a valve annular channel 9 of the regulator housing 2. The valve annular channel 9 has at least one valve opening in its channel base. Under the pressure of the inflowing medium, the elastic valve body 8 can deform such that the valve body 8 moves from the open position into the closed position counter to the restoring force of the inherent elasticity of the elastic material used for said valve body.

The valve 7 has the function of creating an additional liquid passage in the case of low connection pressure, which liquid passage, in the case of progressively rising pressure of the inflowing medium, ensures a rapid increase in flow rate up to the desired maximum value. As a result of the axial shaping of the valve annular channel 9 adapted to the regulator annular channel 3, it is possible for the at least one valve opening of the valve 7 to have a relatively large opening cross section. The valve body 8 is of annular configuration and can be manufactured inexpensively from elastic material. Since the valve body 8 does not need to be guided in a displaceable manner for example in an axial direction, but rather has merely to deform in the radial direction under the pressure of the inflowing medium, the valve 7 is also not susceptible to faults and requires little maintenance. Since the valve body 8 does not need to be guided in a displaceable manner for example in an axial direction, and since, as a result of the annular shaping of the valve annular channel 9 adapted to the regulator annular channel 3, the valve opening can be configured in a space-saving manner and nevertheless with a relatively large clear opening area, it is possible for the flow rate regulators 1, 110 illustrated here to be of high-performance and compact configuration.

It can be seen from FIGS. 1 to 14 that the valve annular channel 9 and the regulator annular channel 3 are arranged concentrically with respect to one another in relation to the housing longitudinal axis of the regulator housing 2. Here, the valve annular channel 9 of the flow rate regulators 1, 110 is arranged to the outside of the regulator annular channel 3. In the flow rate regulator embodiments 1, 110, the regulating profiling 5 is formed by recessed portions 10 and protruding portions 11, oriented in the throughflow direction, of the channel wall.

In order that neither the throttle body 4 nor the valve body 8 can be lost under any circumstances, it is advantageous for the throttle body 4 in the regulator annular channel 3 and the valve body 8 in the valve annular channel 9 to be secured at both sides in the axial direction. From the plan views of the outflow side of the flow rate regulators 1, 110 in FIGS. 5, 9 and 14, it is clear that the annular channels 3, 9 form in each case one annular opening interrupted by radial webs 12 and 13. In order that the throttle body 4 and the valve body 8 are also secured on the inflow side of the regulator housing 2, so as to be prevented from unintentionally floating upward, and in order to ensure the arrangement of the throttle body 4 and valve body 8 in the associated annular channels 3, 9, there is provided a securing element 14 which in this case is of cross-shaped form in plan view and which bears against the inflow side, which is arranged in a plane, of the regulator housing 2 and engages over the annular channels 3, 9 in such a way that the throttle body 4 and valve body 8 are held down in the associated annular channels 3, 9. From the longitudinal section in FIG. 8, it is clear that the securing element 14 is held in a releasably connectable and preferably lockable manner on the inflow side of the regulator housing 2. The securing element 14 has, for this purpose, a projecting connecting peg 15 which can be inserted in a releasable manner into a central connecting opening 16 on the inflow side of the regulator housing 2.

The flow rate regulators 1, 110 illustrated here can be configured in a space-saving and compact manner such that they can also be releasably fastened on the inflow side of a jet regulator, without influencing the installation height thereof so as to prevent said jet regulator from being readily insertable into the water outlet of a sanitary outlet fitting.

Figure 15:
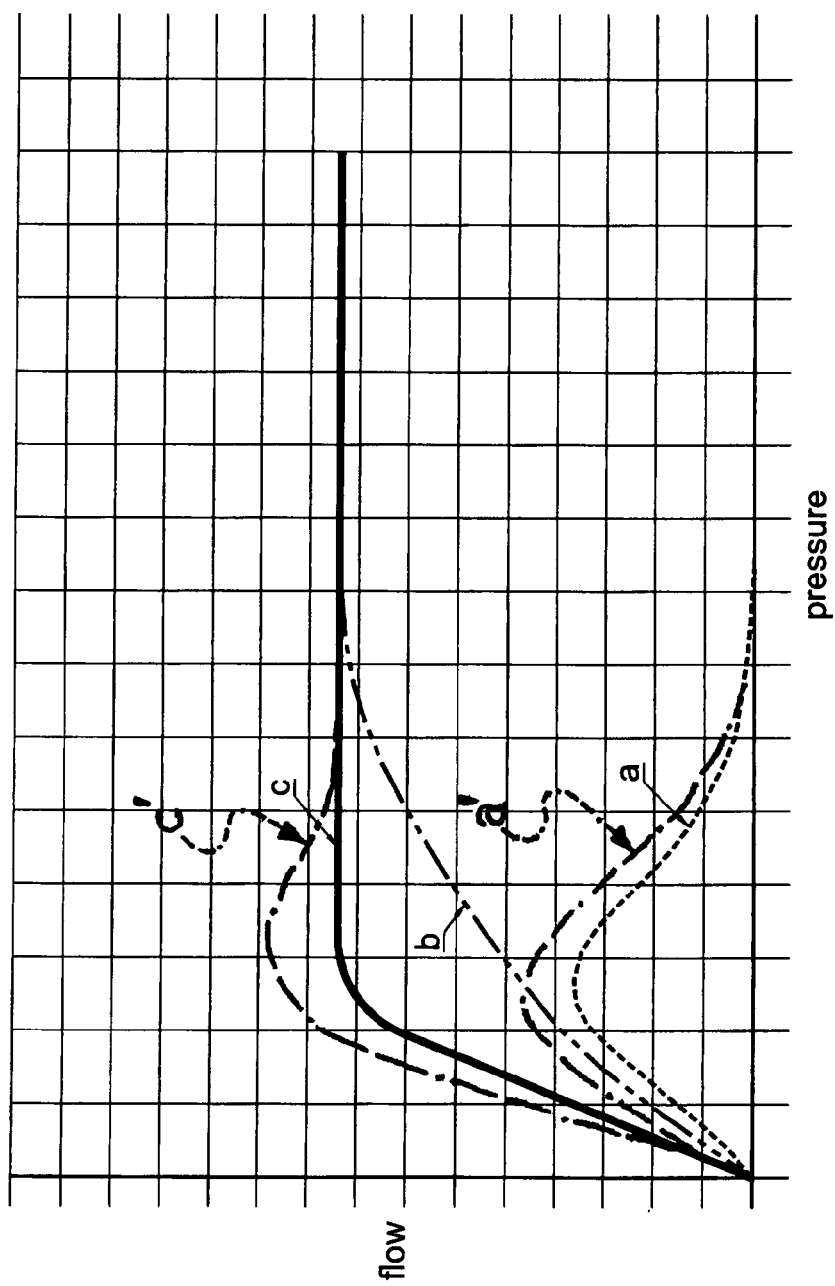
FIG. 15 shows a performance diagram illustrating the flow rate of the flow rate regulator shown in FIGS. 1 to 14 as a function of the pressure of the inflowing medium.

From the performance diagram in FIG. 15, it is clear that the flow rate regulators 1, 110 shown here are distinguished by an optimized performance profile with respect to the pressure of the inflowing fluid. Here, the reference sign b indicates the flow volume passing through the region of the regulator annular channel 3 per unit of time as a function of the pressure of the inflowing fluid. By contrast, the curve profile denoted by the reference sign a denotes the additional volume that can flow through the valve 7; here, it is also clear that, above a certain pressure of the inflowing fluid, the elastic valve body 8 sealingly closes off the at least one valve opening of the valve 7, such that above said pressure, no further fluid volume should flow through the valve 7. The curve profiles a and b add up to give the now optimized performance curve, denoted by the reference sign c, of the flow rate regulators 1, 110, which specifically can achieve the desired maximum value of the flow rate even in the case of relatively low pressures of the inflowing fluid.

It is by all means possible for the curve profile a', which indicates the additional volume flowing through the valve 7, to rise more steeply than the curve profile b of the flow volume passing through the region of the regulator annular channel 3 per unit of time, this resulting in an even steeper curve c' and a curve form which overshoots in the low-pressure range, said curve form however falling, even in the case of rising pressures, to the desired maximum flow rate of the flow rate regulator again after the closure of the valve channel and the fall of the curve a'. To allow the curve profile to initially rise even beyond the maximum flow rate of the flow rate regulator in this way in the low-pressure range, the valve 7 may for example be correspondingly configured by means of a correspondingly large clear cross section of its valve opening.

LIST OF REFERENCE NUMERALS

1 Flow rate regulator (as per FIGS. 1 to 9)
110 Flow rate regulator (as per FIGS. 10 to 14)
2 Regulator housing
3 Regulator annular channel
4 Throttle body
5 Regulating profiling
6 Control gap
7 Valve
8 Valve body
9 Valve annular channel
10 Recessed portion (of the regulating profiling 5)
11 Protruding portion (of the regulating profiling 5)
12 Webs (in the region of the regulator annular channel 3)
13 Webs (in the region of the valve annular channel 9)

14 Securing element
15 Connecting peg (of the securing element 14)
16 Connecting opening (of the regulator housing 2)

The invention claimed is:

1. A flow rate regulator (1, 110) comprising a regulator housing (2) that has at least one regulator annular channel (3) in which there is provided an annular throttle body (4) comprised of elastic material, said throttle body (4) delimits a control gap (6) between itself and a channel wall which bears a regulating profiling (5), a passage cross section of said control gap (6) is variable by the throttle body (4) that deforms under a pressure difference that is generated as a flow of a medium passes therethrough, and having at least one valve (7) that has a valve body (8) which, under a pressure of the medium flowing through, moves from an open position into a closed position counter to a restoring force, in said closed position the valve body (8) closes off at least one valve opening, the valve body (8) is provided in at least one valve annular channel (9) of the regulator housing (2), said valve annular channel (9) has at least one valve opening in a region of a channel base, the valve body (8) is of annular configuration and is produced from elastic material, and the annular valve body (8) deforms under the pressure of the medium flowing through such that the valve body (8) moves from the open position into the closed position counter to a restoring force of an inherent elasticity of the elastic material used for the valve body (8).

2. The flow rate regulator as claimed in claim 1, wherein the at least one valve annular channel (9) and the at least one regulator annular channel (3) are arranged concentrically with respect to one another.

3. The flow rate regulator as claimed in claim 1, wherein the at least one valve annular channel (9) is arranged outside of the regulator annular channel (3).

4. The flow rate regulator as claimed in claim 1, wherein the regulating profiling (5) is formed by recessed portions and protruding portions (10, 11) of the channel wall.

5. The flow rate regulator as claimed in claim 1, wherein the regulating profiling (6) is provided on at least one of an inner or an outer channel wall of the at least one regulator annular channel (3).

6. The flow rate regulator as claimed in claim 1, wherein at least one of the throttle body (4) in the regulator annular channel (3) or the valve body (8) in the valve annular channel (9) is secured in the axial direction.

7. The flow rate regulator as claimed in claim 6, wherein an inflow side, which serves as an insertion opening for the throttle and the valve bodies (4, 8), of the regulator annular channel (3) or valve annular channel (9) is securable by at least one securing element (14).

8. The flow rate regulator as claimed in claim 7, wherein the at least one securing element (14) is held in a releasable manner on the regulator housing (2).

9. The flow rate regulator of claim 7, wherein the securing element is cross-shaped.

10. The flow rate regulator of claim 6, wherein at least one of the throttle body (4) or the valve body (8) is secured at both sides in a respective one of the regulator annular channel (3) or the valve annular channel (9).

11. The flow rate regulator of claim 4, wherein the recessed portions and the protruding portions are oriented in a through-flow direction.

12. The flow rate regulator of claim 1, wherein the throttle body (4) and the valve body (8) are separately removable from the regulator housing (2).

* * * * *